United States Patent [19]

Shikama et al.

[11] Patent Number: 5,210,516
[45] Date of Patent: May 11, 1993

[54] PTC THERMISTOR AND PTC THERMISTOR PRODUCING METHOD, AND RESISTOR WITH A PTC THERMISTOR

[75] Inventors: Takashi Shikama; Yuichi Takaoka; Takayo Katsuki; Tomoaki Tadokoro, all of Shiga, Japan

[73] Assignee: Murata Manufacturing Co., Ltd., Kyoto, Japan

[21] Appl. No.: 659,832

[22] Filed: Feb. 22, 1991

[30] Foreign Application Priority Data

Feb. 22, 1990 [JP] Japan .............................. 2-43640
Nov. 22, 1990 [JP] Japan .............................. 2-319723
Nov. 28, 1990 [JP] Japan .............................. 2-332221

[51] Int. Cl.⁵ ............................................... H01C 7/10
[52] U.S. Cl. ..................................... 338/22 R; 56/108; 338/225 D; 338/309; 338/327; 338/328
[58] Field of Search .................. 338/22 R, 225 D, 327, 338/309, 328; 156/60, 108; 437/918, 225; 204/192.21

[56] References Cited

U.S. PATENT DOCUMENTS

| | | | |
|---|---|---|---|
| 3,296,574 | 1/1967 | Tassara | 338/327 X |
| 4,053,864 | 10/1977 | Rodriguez et al. | 338/22 SD |
| 4,053,866 | 10/1977 | Mertz | 338/327 X |
| 4,325,051 | 4/1982 | Rodriguez | 338/309 X |
| 4,431,983 | 2/1984 | Rodriguez | 338/327 X |

FOREIGN PATENT DOCUMENTS

| | | |
|---|---|---|
| 0129997 | 1/1985 | European Pat. Off. |
| 0334473 | 9/1989 | European Pat. Off. |
| 2336778 | 7/1977 | France |
| 1-316904 | 12/1989 | Japan |

OTHER PUBLICATIONS

Werner Kahr "Siemens Components" vol. 20, No. 4, pp. 152–157 (Dec. 1989).

*Primary Examiner*—Marvin M. Lateef
*Attorney, Agent, or Firm*—Heller, Ehrman, White & McAuliffe

[57] ABSTRACT

A PTC thermistor has its substrate entirely coated with an insulating glass material except for the area where a silver electrode is formed. Such a thermistor may be produced by coating a substrate with an insulating glass material, forming a silver layer on the coated substrate and fusing the silver layer with a part of the glass material so as to form an electrode adhering to the substrate. An underelectrode may be provided between the substrate and such an electrode. A resistor is formed by encasing such a PTC thermistor with a pair of spring terminals for supporting the thermistor therebetween.

17 Claims, 6 Drawing Sheets

PTC THERMISTOR AND PTC THERMISTOR PRODUCING METHOD, AND RESISTOR WITH A PTC THERMISTOR

BACKGROUND OF THE INVENTION

1. Field of the Invention

The present invention relates to a PTC (positive temperature coefficient) thermistor adapted to be employed in a heating circuit, an overcurrent protection circuit or the like and a method of producing such PTC thermistors, and a resistor adapted to be employed in a magnetic erasure circuit for a television and a radiator for a fan forced heater, a water-proof heater or the like.

2. Description of Related Art

Figure 20:
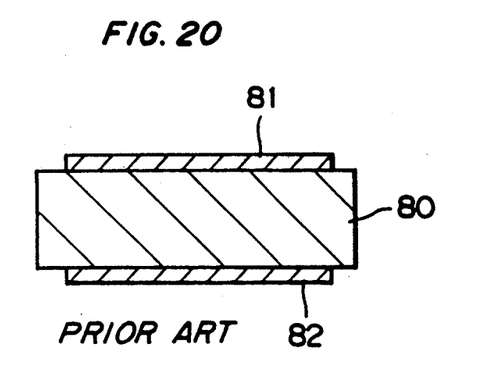
FIGS. 20 and 21 vertical sectional views of existing PTC thermistors.
Figure 21:
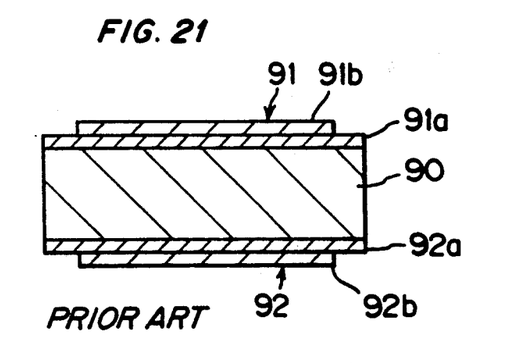

FIGS. 20 and 21 show existing PTC thermistors. Referring to FIG. 20, electrodes 81 and 82 made of a silver compound which performs ohmic contact, such as a compound of silver with zinc, a compound of silver with tin, etc., are formed on upper and lower surfaces of a substrate 80. Referring to FIG. 21, double-layered electrodes 91 and 92 are formed on upper and lower surfaces of a substrate 90. The electrode 91 is composed of an underelectrode 91a formed on the surface of the substrate 90 and a silver electrode 91b formed thereon. The electrode 92 is composed of an underelectrode 92a and a silver electrode 92b likewise. The reasons why a silver compound is used as the electrodes 81, 82, 91b and 92b are that a lead terminal is soldered with silver easily and that silver is excellent in ohmic contact.

Using a silver compound as an electrode, however, has a disadvantage that the main constituent of the electrode (silver) is likely to react with chlorine ions of water in air and be ionized, causing silver ions to migrate. More specifically, the substrates 80 and 90 are ceramic, and the surface potential of each substrate 80 or 90 is not uniform, whereby ionized silver of the electrodes 81 and 82, or 91 and 92 migrates on the surface from a higher potential area to a lower potential area. This migration of silver ions may cause a short circuit.

Also, since the substrates 80 and 90, and the electrodes 81, 82, 91 and 92 are exposed, these thermistors are likely to be affected by external force and become defective easily. For example, the substrates 80 and 90 may develop cracks and chips during the production or the transport. Also, the electrode 81, 82, 91 or 92 may peel off the substrate 80 or 90, causing a spark at the time of impressing a voltage. Thus, from an electrical point of view, such thermistors are not reliable.

Further, since the sides of the substrates 80 and 90, which are porous, are exposed, harmful gases such as a chlorine gas, a halogen gas, etc. are likely to penetrate into the substrates 80 and 90 through the sides, deteriorating the substrates 80 and 90. Such a deteriorated substrate impairs the performance of the PTC thermistor.

From thermistors as shown in FIGS. 20 and 21, generated heat leaks, and when such a thermistor is employed in a magnetic erasure circuit for a television, a picture received by the television shakes. When such a thermistor is employed in a radiator for a fan forced heater, a water-proof heater or the like, the thermistor interferes with an improvement of the radiator in temperature-rise characteristic. Further, a PTC thermistor is conventionally housed in an insulating case having holes through which terminals are protruded, and there is fear that substances which deteriorate the PTC thermistor, such as flux, chlorine, etc., may penetrate into the case through the holes. Furthermore, the PTC thermistor may be displaced from a set position and may contact with the inner wall of the insulating case. In this case, a gas is generated from the insulating resin of the case with the generation of heat by the PTC thermistor, and this gas may deteriorate the PTC thermistor.

SUMMARY OF THE INVENTION

Therefore major objects of the present invention are to provide a PTC thermistor having an improved electrode which does not cause migration of silver ions and is reliable from an electrical point of view, the PTC thermistor being protected from external force and gases, and to provide a method of producing such PTC thermistors.

Another object of the present invention is to provide a resistor wherein heat generated by a PTC thermistor is hard to leak, the resistor being adaptable for circumstances.

In order to attain the objects above, a PTC thermistor according to the present invention comprises a substrate; an electrode whose main constituent is silver, the electrode being formed on the substrate; and a glass coating for covering the entire surface of the substrate except for the area where the electrode is formed. A method of producing the PTC thermistor comprises the steps of coating a substrate of the PTC thermistor with a glass material; forming a silver layer on the coated substrate; and fusing the silver layer with a part of the glass material therearound by heat so that the silver layer changes into an electrode whose main constituent is silver, the electrode adhering to the substrate, and that the rest of the glass material covers the entire surface of the substrate except for the area where the silver electrode is formed.

Another PTC thermistor according to the present invention comprises a substrate; an underelectrode formed on the substrate; an electrode whose main constituent is silver, the electrode being formed on the underelectrode; and a glass coating for covering the entire surface of the substrate except for the area where the silver electrode is formed. A method of producing the PTC thermistor comprises the steps of coating a substrate of the PTC thermistor with a glass material, the substrate having an underelectrode on its surface; forming a silver layer on the coated substrate; and fusing the silver layer with a part of the glass material therearound by heat so that the silver layer changes into an electrode whose main constituent is silver, the electrode adhering to the underelectrode, and that the rest of the glass material covers the entire surface of the substrate except for the area where the silver electrode is formed.

In the structure above, an insulating glass material exists between silver electrodes, whereby even if there is potential difference on the surface of the substrate, migration of silver ions is prevented. Since the glass coating and the substrate adhere to each other firmly, there is no fear that silver ions may migrate along the interface between the glass coating and the substrate. In short, the PTC thermistor is free from migration of silver ions. Also, the PTC thermistor is protected from external force and gasses by the glass coating. In soldering a lead terminal with the silver electrode, there is no fear that the substrate may be deteriorated by harmful substances such as flux. Thus, the glass coating enables the PTC thermistor to be adaptable for circumstances.

The PTC thermistor producing method according to the present invention provides firm adhesion of a silver electrode to a substrate or an underelectrode, and therefore a lead terminal soldered with the silver electrode of the PTC thermistor is reliable in respect to electrical connection. This PTC thermistor producing method is a method achieved by adding a glass coating step to well-known steps. Accordingly, in order to carry out this method, only a small change of facilities is required.

A resistor according to the present invention comprises a PTC thermistor which is coated with a glass material except for the area where an electrode is formed; a case for housing the PTC thermistor; and a pair of terminals disposed in the case so as to hold the PTC thermistor by nipping the PTC thermistor therebetween. Another resistor according to the present invention comprises a PTC thermistor which is coated with a glass material except for the area where an electrode is formed; and a heat radiating member for radiating heat generated by the PTC thermistor.

In the structure above, since the PTC thermistor is coated with a glass material except for the area where the electrode is formed, heat generated by the PTC thermistor hardly leaks, thereby reducing the residual electric current. Using such a resistor in a magnetic erasure circuit for a television provides an improved television which has little picture shaking. Since the residual electric current is reduced, the resistance of a magnetic erasure coil in the magnetic erasure circuit increases. Accordingly, a coil of a small diameter, which is cheap and compact, can be used as the magnetic erasure coil. The PTC thermistor is shielded from the outside world by the glass coating except for the silver electrode, which arrangement improves its adaptability for circumstances. Because of the glass coating on the PTC thermistor, when the PTC thermistor housed in the case is displaced from the set position and contacts with the inner wall of the case, the case is not heated by the PTC thermistor so much as by a thermistor without a glass coating in an existing resistor. Therefore the number of alternatives for a material of the case increases, and such resistors can be mounted more densely. Also, the glass coating eliminates the necessity of providing in the case a protrusion for preventing the contact of the PTC thermistor with the inner wall of the case. Further, even if the case is so heated by the PTC thermistor that harmful gasses are generated, the PTC thermistor is protected from the gasses by the glass coating.

In the resistor, since heat generated by the PTC thermistor hardly leaks from the surface, the heat efficiency on the electrode increases, whereby the PTC thermistor obtains more calorific power. Thus, the temperature-rise characteristic of the PTC thermistor is improved, and a heater employing such a PTC thermistor is excellent in temperature-rise characteristic. In order to obtain the same heating value, a smaller PTC thermistor can be used because the calorific power of the PTC thermistor is large. Consequently, the heater can be made compact, and the production cost can be reduced. Further, since the PTC thermistor is shielded from the outside world by the glass coating except for the silver electrode, its adaptability for circumstances is improved, and therefore the heater employing the PTC thermistor is reliable. Also, since the glass coating protects the PTC thermistor from external force, there is no fear that the substrate may form cracks and chips or that the underelectrode may peel off the substrate.

BRIEF DESCRIPTION OF THE DRAWINGS

These and other objects and features of the present invention will become apparent from the following description taken in conjunction with the preferred embodiments thereof with reference to the accompanying drawings, in which:

FIGS. 1 through 4 show a first embodiment of the present invention;

FIGS. 5 through 10 show a second embodiment of the present invention;

FIGS. 12 through 15 show a fourth embodiment of the present invention;

FIGS. 16 through 19 show a fifth embodiment of the present invention;

DETAILED DESCRIPTION OF THE PREFERRED EMBODIMENTS

The following describes preferred embodiments of the present invention with reference to the drawings.

First Embodiment: FIGS. 1–4

Figure 1:
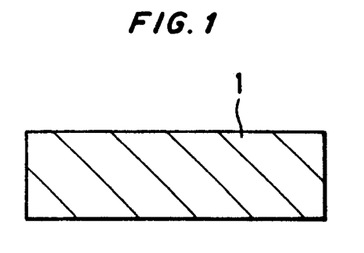
FIG. 1 is a vertical sectional view of a substrate of a PTC thermistor.

FIG. 1 is a vertical sectional view of a substrate 1 of a PTC thermistor. The substrate 1 is rectangular and is made of ceramics such as $BaTiO_3$.

Figure 2:
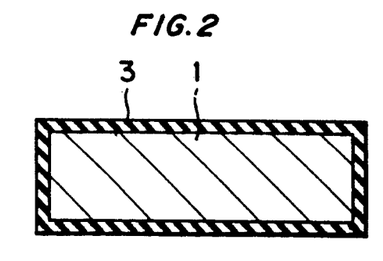
FIGS. 2, 3 and 4 are vertical sectional views of the PTC thermistor showing a process of forming a glass coating and silver electrodes.
Figure 3:
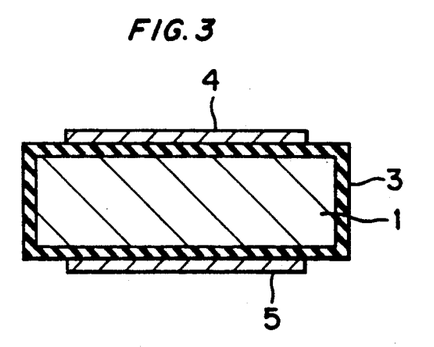

First, as shown in FIG. 2, the substrate 1 is entirely coated with a bismuth glass material 3 by barrel processing or spraying. Silver paste is spread on the glass coating 3, and silver layers 4 and 5, whose thickness is 2–6 $\mu m$, are fixed thereon by printing (see FIG. 3).

Next, the substrate 1 is sintered at 500° C. for 30 minutes. In this processing, the glass material 3 around the silver layers 4 and 5 fuses therewith. Thus, the silver layers 4 and 5 change into electrodes 4a and 5a (see FIG. 4). The electrodes 4a and 5a of which the main constituent is silver firmly adhere to the substrate 1. The rest of the glass material 3 forms a glass coating 3a for protecting the sides and corners of the substrate 1. The glass coating 3a is insulating and firmly adheres to the substrate 1. Then, the PTC thermistor is finished by soldering lead terminals onto the electrodes 4a and 5a.

Second Embodiment: FIGS. 5-10

Figure 5:
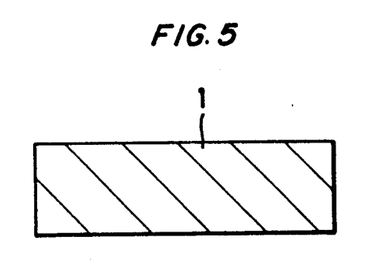
FIG. 5 is a vertical sectional view of a substrate of a PTC thermistor.

FIGS. 5 through 10 show a second embodiment of the present invention, and in the drawings, the same components as used in the first embodiment are indicated by the same numerals. FIG. 5 is a vertical sectional view of a substrate 1 of a PTC thermistor. The substrate 1 is rectangular and is made of ceramics such as $BaTiO_3$.

Figure 6:
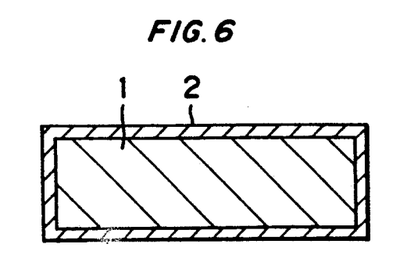
FIGS. 6 and 7 are vertical sectional views of the PTC thermistor showing a process of forming underelectrodes.
Figure 7:
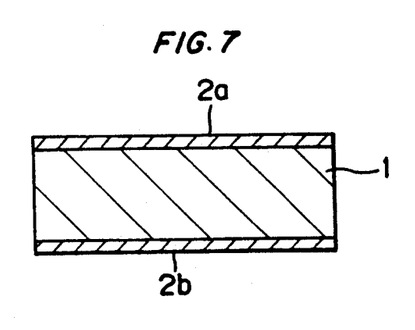

First, the substrate 1 is entirely coated with nickel by electroless plating (see FIG. 6). In view of cost and reliability, preferably the nickel coating 2 is about 1 $\mu$m thick.

The unnecessary part of the nickel coating 2 (that is, the nickel on the sides of the substrate 1) is removed by chemical etching, rubbing or blasting. The nickel coating which remains on the upper and lower surfaces of the substrate 1 becomes underelectrodes 2a and 2b (see FIG. 7).

Figure 8:
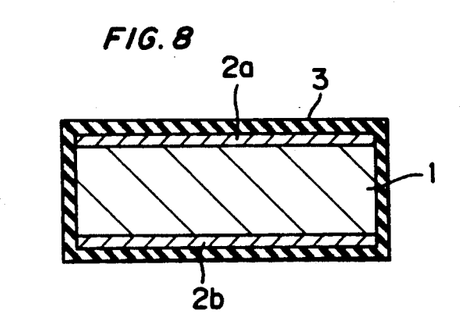
FIGS. 8, 9 and 10 are vertical sectional views of the PTC thermistor showing a process of fforming a glass coating and silver electrodes.
Figure 9:
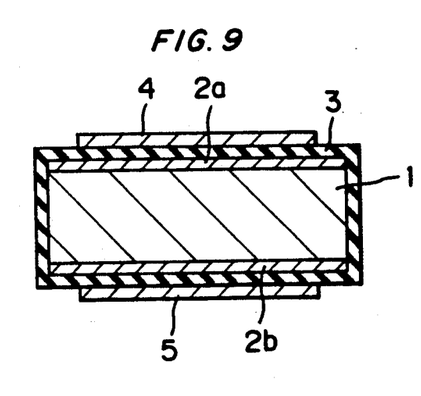

Next, as shown in FIG. 8, the substrate 1 with the underelectrodes 2a and 2b is entirely coated with a bismuth glass material 3 by barrel processing or spraying. Silver paste is spread on the parts of the glass coating 3 under which the underelectrodes 2a and 2b are formed, and silver layers 4 and 5 of thickness 2-6 $\mu$m are fixed thereon by printing. Thereafter, the substrate 1 is sintered at 500° C. for 30 minutes. In this processing, the glass material 3 around the silver layers 4 and 5 fuses therewith, and thus the silver layers 4 and 5 change into electrodes 4a and 5a (see FIG. 10). The electrodes 4a and 5a whose main constituent is silver firmly adhere to the underelectrodes 2a and 2b. The rest of the glass material 3 forms a bismuth glass coating 3a for protecting the sides and corners of the substrate 1. The glass coating 3a is insulating and firmly adheres to the substrate 1. Then, the PTC thermistor is finished by soldering lead terminals onto the electrodes 4a and 5a.

Figure 4:
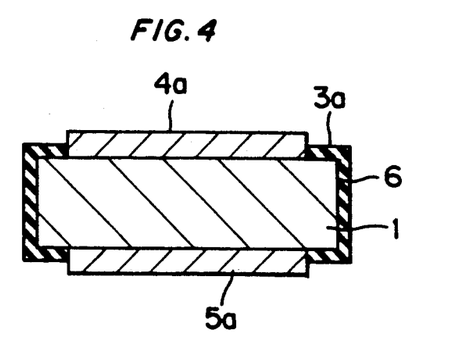
Figure 10:
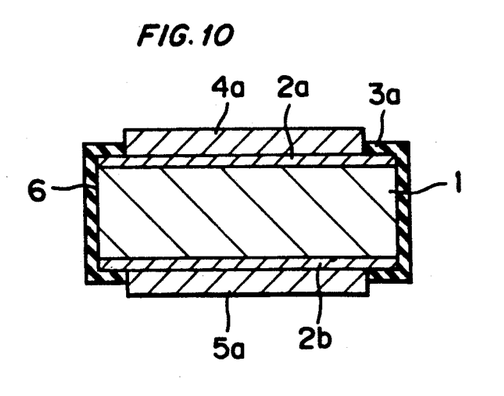

With the structure according to the first or the second embodiment, even if the silver electrodes 4a and 5a reacts with chlorine ions of water in air and is ionized, the insulating coating 3a formed between the electrodes 4a and 5a prevents migration of the silver ions. Also, since the glass coating 3a and the substrate 1 are firmly joined together, the silver ions cannot migrate on the interface between the glass coating 3a and the substrate 1. Since the glass coating 3a covers the substrate 1 except for the parts where the electrodes 4a and 5a are formed, the substrate 1 does not receive external force directly. This serves to prevent the substrate 1 from developing cracks and chips and the underelectrodes 2a and 2b from peeling off. The glass coating 3a also protects the substrate 1 from harmful gases in outside air. That is, there is no fear that the characteristic of the PTC thermistor may change due to harmful gases.

The electrodes 4a and 5a whose main constituent is silver function as contacts with terminals. In the first and the second embodiments, the electrodes 4a and 5a firmly adhere to the substrate 1 or the underelectrodes 2a and 2b, and therefore the PTC thermistors according to these embodiments are reliable in respect to electrical connection.

Figure 11:
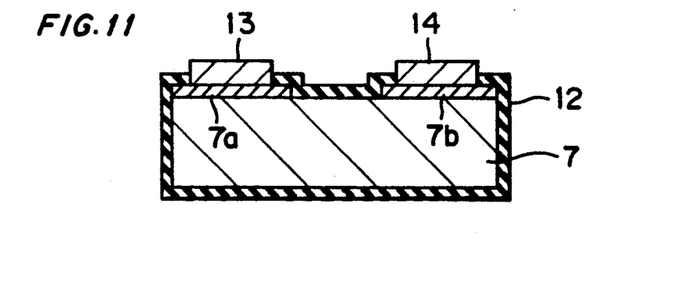
FIG. 11 is a vertical sectional view of a PTC thermistor according to a third embodiment of the present invention.

Third Embodiment: FIG. 11

FIG. 11 shows a PTC thermistor according to a third embodiment of the present invention. The PTC thermistor has two electrodes 13 and 14 whose main constituent is silver, the electrodes 13 and 14 lying parallel to each other on the upper surface of a substrate 7. Two underelectrodes 7a and 7b are disposed parallel to each other on the upper surface of the substrate 7, and the electrodes 13 and 14 are formed thereon. A bismuth glass material 12 is coated all over the substrate 7 except for the parts where the electrodes 13 and 14 are formed. Even if silver which is a main constituent of the electrodes 13 and 14 is ionized, the insulating glass coating 12 prevents migration of the silver ions.

The PTC thermistor according to the third embodiment may be modified so as not to have the underelectrodes 7a and 7b. The modified PTC thermistor brings the same effect as the PTC thermistor having the underelectrodes 7a and 7b.

Fourth Embodiment: FIGS. 12-15

Figure 15:
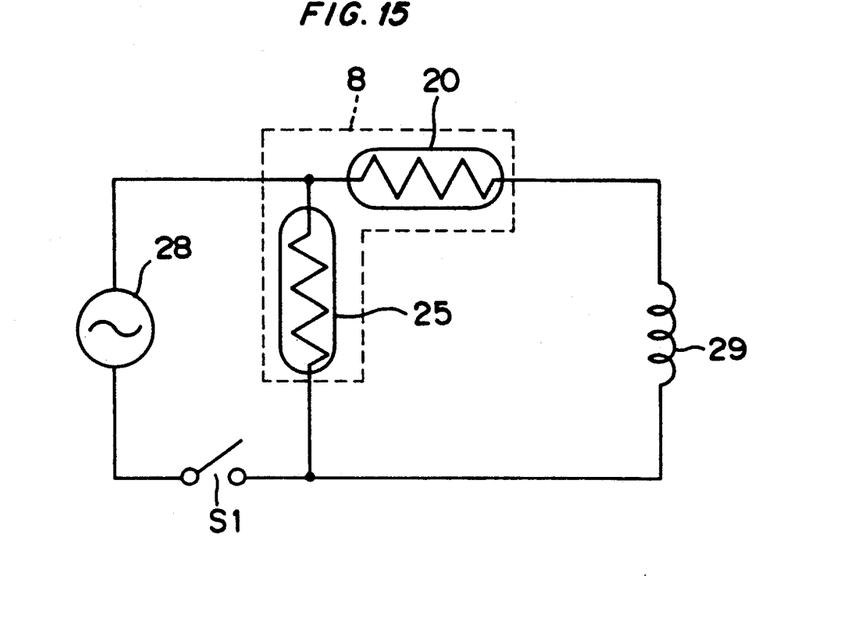
FIG. 15 is a diagram of a magnetic erasure circuit in which the resistor is employed.

A fourth embodiment of the present invention is a double-type resistor 8 comprising two PTC thermistors. The resistor 8 is employed in a magnetic erasure circuit for a television as shown in FIG. 15.

The resistor 8 has an insulating case 9 in which a pair of spring terminals 15 (see FIG. 14) and a common terminal 16 (see FIG. 13) are housed. A magnetic erasing PTC thermistor 20 is placed between one of the spring terminals 15 and the common terminal 16 so as to be stuck between tabs 15a of the spring terminal 15 and a heat exchanging part 16a of the common terminal 16. A heating PTC thermistor 25 is placed between the other spring terminal 15 and the common terminal 16 in the same manner as the magnetic erasing PTC thermistor 20. The thermistors 20 and 25 are of the type shown in FIG. 10. The insulating case 9 is made of phenol resin or the like.

Figure 12:
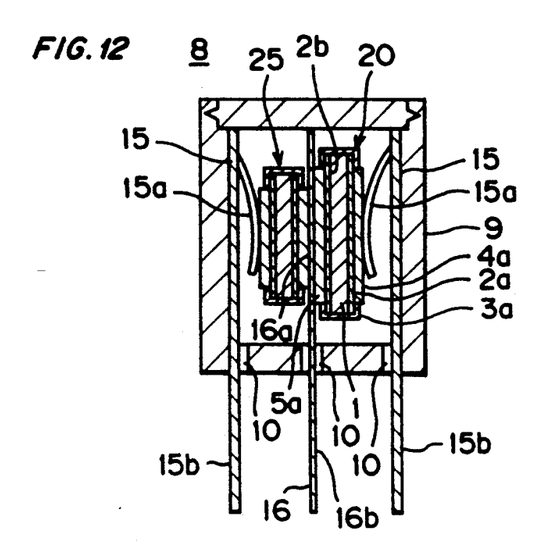
FIG. 12 is a vertical sectional view of a resistor.
Figure 13:
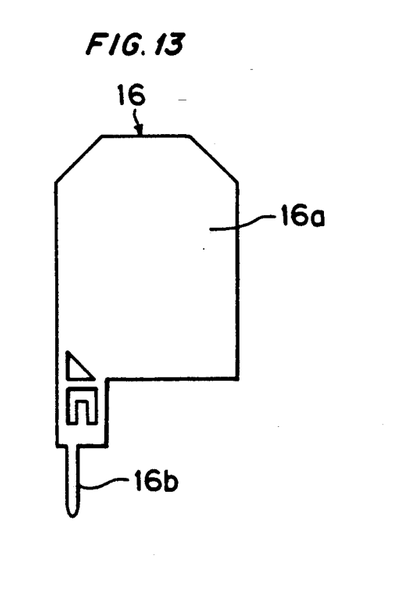
FIG. 13 is a plan view of a common terminal.
Figure 14:
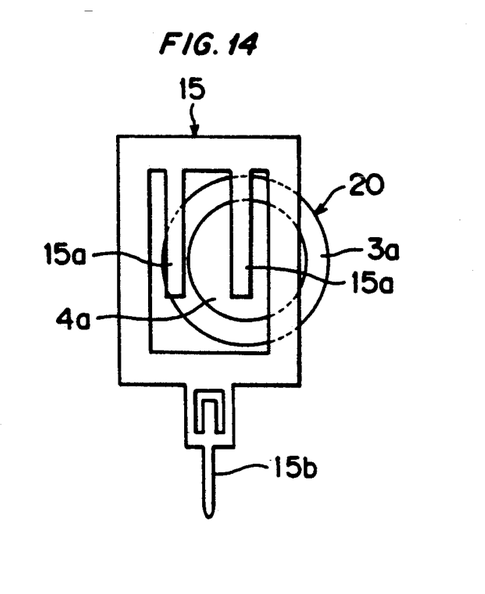
FIG. 14 is a plan view of a PTC thermistor and a spring terminal showing the positional relationship.

Leads 15b and 16b of the respective terminals 15 and 16 are protruded from the case 9 through holes 10 made in the bottom thereof. The spring terminal may be produced by punching a stainless plate of thickness 0.25 mm and coating the surface with tin. The common terminal 16, as an example, is produced by punching a stainless plate of thickness 0.10 mm and coating the surface with tin.

The PTC thermistors 20 and 25 have the glass coating 3a on the surfaces. Chlorine gases as or other harmful gasses may penetrate into the case 9 through the holes 10, but even in this case, the PTC thermistors 20 and 25 are protected from the gases by the glass coating 3a. Also, if the PTC thermistor 20 or 25 is displaced from the set position and contacts with the inner wall of the case 9, the case 9 is less heated by the thermistor 20 or 25 than it would be a prior art thermistor without a glass coating. Even if a harmful gas is generated from the case 9 by the heat from the PTC thermistors 20 and 25, the PTC thermistors 20 and 25 are protected from the gas by the glass coating 3a. Further, even if the PTC thermistor 20 or 25 is displaced from the set position such that one of the tabs 15a keeps contacting with the electrode 4a and that the other tab 15a moves away from the electrode 4a and comes in contact with another part of the thermistor 20 or 25, there will be no spark because the glass coating 3a prevents the tab 15a from contacting with the nickel electrode 2a.

The resistor 8 thus structured is employed in a magnetic erasure circuit as shown in FIG. 15. In the magnetic erasure circuit, when a switch S1 is turned on, an alternating current source 28 provides a magnetic erasing coil 29 with an electric current, thereby causing a magnetic flux. Simultaneously the magnetic erasing PTC thermistor 20 and the heating PTC thermistor 25 are activated. Then, as the thermistor 20 heats up, its resistance increases. As a result, the current flowing from the thermistor 20 to the magnetic erasing coil 29 decreases, and the magnetic erasing coil 29 performs magnetic erasure. The heat PTC thermistor 25 heats up likewise when it is activated. Since the thermistors 20 and 25 are connected by the heat exchanging part 16a of the common terminal 16, the thermistor 20 is further heated by the heat from the thermistor 25. As a result, the current flowing to the magnetic erasing coil 29 further decreases.

We conducted an experiment to examine effects of the glass coating on PTC thermistors. A bare PTC thermistor made of a disk of 14 mm in diameter and 2 mm in thickness, with Curie point of 50° C., and resistance at room temperature (25° C.) of 5.0Ω was used as the magnetic erasing thermistor 20, and a bare PTC thermistor made of a disk of 12 mm in diameter and 2 mm in thickness, with Curie point of 143° C. and resistance at room temperature (25° C.) of 180Ω was used as the heating PTC thermistor 25. Under these conditions, an electric current flowing to the magnetic erasing coil 29 60 seconds after a turning-on of the switch S1 was measured to be 1.5 mA. Next, the same thermistors were coated with a glass material, and the coated thermistors were used as the magnetic erasing PTC thermistor 20 and the heating PTC thermistor 25. Under these conditions, an electric current flowing to the magnetic erasing coil 29 60 seconds after a turning-on of the switch S1 was measured to be 1.0 mA. As is evident from the experiment, using glass-coated PTC thermistors brings a decrease of an electric current flowing to the magnetic erasing coil 29. Therefore when a resistor comprising such glass-coated PTC thermistors is employed in a magnetic erasure circuit for a television, the television can be improved in picture shaking.

Fifth Embodiment: FIGS. 16-19

A fifth embodiment of the present invention is a fan forced heater in which a PTC thermistor is employed.

Figure 16:
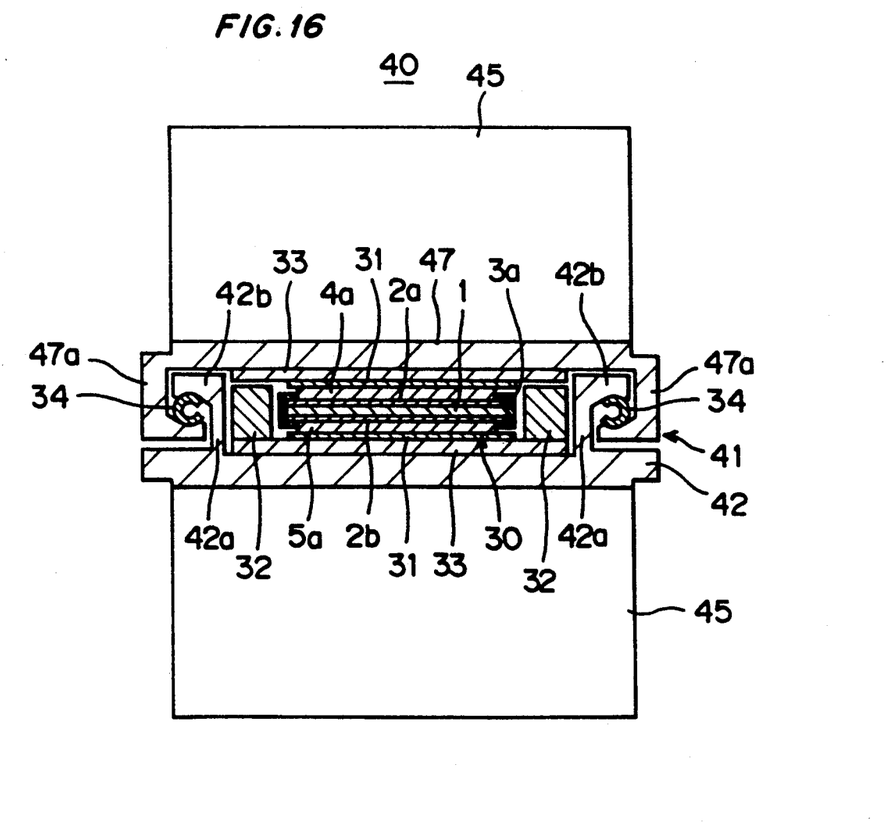
FIG. 16 is a vertical sectional view of a fan forced heater.

As shown in FIG. 16, a fan forced heater 40 has a metal case 41 in which a PTC thermistor 30 and metal terminals 31 are housed. The PTC thermistor 30 is of the type shown in FIG. 10. The metal case 41 acts as a heat radiator, and it consists of a container 42 and a lid 47. The container 42 is divided by walls 42a, and the upper part of each wall 42a is formed into a bracket 42b. The lid 47 has engaging members 47a on right and left sides, and the engaging members 47a enclose the respective spring brackets 42b. The container 42 contains the PTC thermistor 30, the metal terminals 31, resin spacers 32 and insulating sheets 33 in a manner that the PTC thermistor 30 is arranged between the metal terminals 31 and that the insulating sheets 33 insulate the metal terminals 31 from the case 41. A spring 34 pressed and shaped like C is disposed in each space between the engaging members 47a and the spring brackets 42b. The container 42, the lid 47, the PTC thermistor 30, the metal terminals 31 and the insulating sheets 33 are kept in position by the force of the springs 34. Heat generated by the PTC thermistor 30 is transmitted to the case 41 via the metal terminals 31 and the insulating sheets 33. Several radiating fins 45 are disposed around the case 41 at uniform intervals so that the heat of the case 41 can be radiated effectively.

The PTC thermistor 30 employed in the heater 40 is coated with the glass material 3a except for the parts where the electrodes are formed, and the glass coating 3a protects the PTC thermistor 30 from harmful gasses such as chlorine gas which may penetrate into the case 40.

Figure 17:
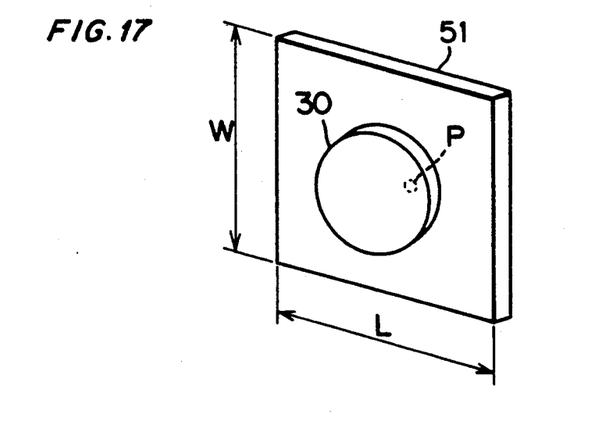
FIG. 17 is a perspective view of a sample device used for measuring the temperature-rise characteristic of a PTC thermistor.
Figure 18:
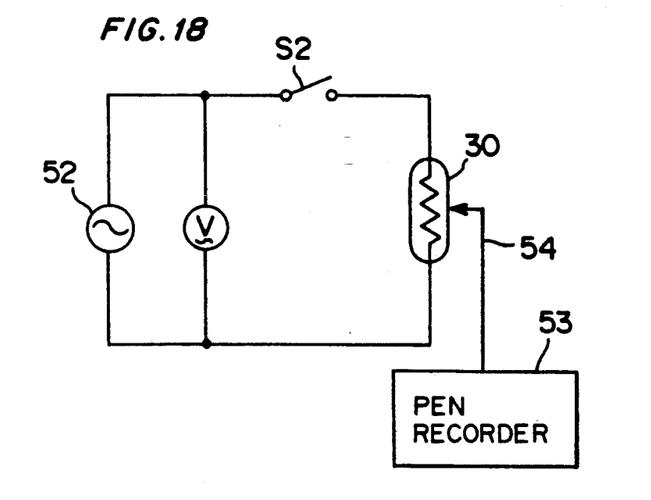
FIG. 18 is a diagram of an electric circuit used for measuring the temperature-rise characteristic.

We conducted an experiment to figure out the temperature-rise characteristic of the PTC thermistor 30. In the experiment, as shown in FIG. 17, a test thermistor was disposed on one side of an aluminum plate 51, which acts as a radiator, at the center. A PTC thermistor whose configuration is a disk of 8.0 mm in diameter and 3.0 mm in thickness, whose Curie point is 216° C., whose resistance under a room temperature (25° C.) is 200–500Ω was used as the test thermistor in the experiment. The length L of the aluminum plate 51 was 40 mm, and its width W was 30 mm. FIG. 18 illustrates a circuit used in the experiment to measure the temperature-rise characteristic of the PTC thermistor 30. In the circuit, when a switch S2 is turned on, an electric current flows from an alternating electric power source 52 (100 volts) to the PTC thermistor 30, and the thermistor 30 heats up. The aluminum plate 51 heats up with the increase of the thermistor 30 in temperature. Temperatures of the PTC thermistor 30 are represented by temperatures at a point P on the side of the aluminum plate 51 reverse to the side on which the PTC thermistor 30 is disposed. Temperatures of the point P were measured by a thermocouple thermometer 54 connected with a pen recorder 53. For comparison, we also figured out the temperature-rise characteristic of a PTC thermistor which is not coated with a glass material in the same manner.

Figure 19:
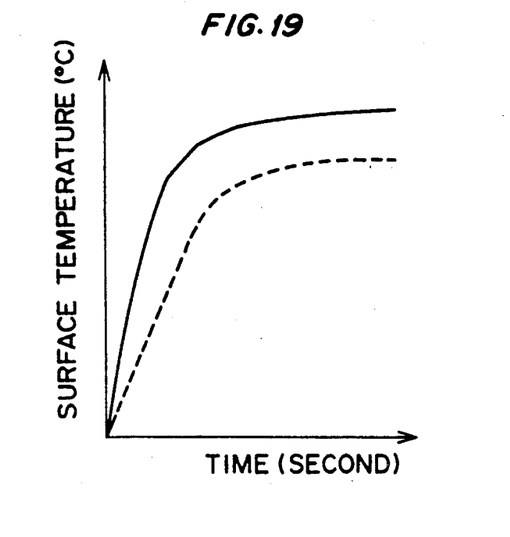
FIG. 19 is a graph showing the result of the measure.

FIG. 19 is a graph showing the result of the experiment recorded by the pen recorder 53. The solid line indicates the temperature-rise characteristic of the glass-coated PTC thermistor. The dashed line indicates the temperature-rise characteristic of the bare PTC thermistor. Table 1 shows the result of the experiment.

TABLE 1

|  | temperature of the plate 51 4 seconds after turning-on of the switch | temperature of the plate 51 1 minute after turning-on of the switch | demand 1 minute after turning-off of the switch |
|---|---|---|---|
| glass-coated PTC thermistor | 140° C. | 60° C. | 66W |
| bare PTC thermistor | 125° C. | 59° C. | 63W |

As is evident from the experiment, the glass coating 3a on the PTC thermistor 30 prevents heat generated by the PTC thermistor 30 from leaking out, thereby increasing the thermal efficiency on the electrodes 4a and 5a and increasing the calorific power of the PTC thermistor 30.

Other Embodiments

Although the present invention has been described in connection with the preferred embodiments above, it is to be noted that various changes and modifications are apparent to those who are skilled in the art. Such changes and modifications are to be understood as included within the appended claims.

For example, the substrate 1 can be shaped into a disk, a cylinder, a ball and others.

The silver layers 4 and 5 can be made of other silver compounds such as a compound of silver with aluminum, gallium or the like.

Although a bismuth glass material is used as the glass coating in the embodiments above, any kind of insulating glass can be selected as the material.

Although the fourth embodiment describes a double-type resistor, the present invention can be applied to a single-type resistor which has a single PTC thermistor, too. Employing at least one glass-coated PTC thermistor in a double-type resistor brings the same effects of the present invention. Also, employing a PTC thermistor which is of the type shown in FIG. 4 in a resistor brings the same effects as employing a PTC thermistor which is of the type shown in FIG. 10.

The fifth embodiment describes a fan forced heater, but the present invention can be applied to a VTR heater, a heater for a hair iron, a water-proof heater, etc. A PTC thermistor which is of the type shown in FIG. 4 can be employed in such a heater.

What is claimed is:

1. A PTC thermistor comprising:
   a substrate;
   an electrode having silver as its main constituent and being formed on the substrate; and
   an insulating glass coating covering the entire surface of the substrate except for the area where the electrode is formed.

2. A PTC thermistor comprising:
   a substrate;
   an underelectrode formed on the substrate;
   an electrode having silver as its main constituent and being formed on the underelectrode; and
   an insulating glass coating covering the entire surface of the substrate except for the area where the electrode is formed.

3. A method for producing a PTC thermistor, said method comprising the steps of:
   coating a substrate with an insulating glass material to obtain a coated substrate;
   forming a silver layer on the coated substrate; and
   fusing the silver layer with a part of the insulating glass material therearound by heat so as to transform the silver layer into an electrode having silver as its main constituent, to cause the electrode to adhere to the substrate, and to have the rest of the insulating glass material cover the entire surface of the substrate except for the area where the electrode is formed.

4. A method of producing a PTC thermistor, said method comprising the steps of:
   coating a substrate with an insulating glass material to obtain a coated substrate, the substrate having an underelectrode on its surface;
   forming a silver layer on the coated substrate; and
   fusing the silver layer with a part of the insulating glass material therearound by heat so as to transform the silver layer into an electrode having silver as its main constitute, to cause the electrode to adhere to the underelectrode, and to have the rest of the insulating glass material cover the entire surface of the substrate except for the area where the electrode is formed.

5. A resistor comprising:
   a PTC thermistor having an electrode formed on an area thereon and being coated with an insulating glass material except for the area where the electrode is formed;
   a case housing the PTC thermistor therein; and
   a pair of terminals disposed in the case so as to hold the PTC thermistor therebetween.

6. A resistor comprising:
   a PTC thermistor having an electrode formed on an area thereon and being coated with an insulating glass material except for the area where the electrode is formed; and
   a heat radiating member for radiating heat generated by the PTC thermistor.

7. The PTC thermistor of claim 1 wherein the substrate is a rectangular ceramic member.

8. The PTC thermistor of claim 2 wherein the underelectrode comprises nickel.

9. The method of claim 3 wherein the silver layer is 2-6 $\mu$m in thickness.

10. The method of claim 9 wherein the step of fusing comprises sintering at 500° C.

11. The method of claim 4 wherein said underelectrode comprises nickel.

12. The method of claim 11 wherein the silver layer is 2-6 $\mu$m in thickness.

13. The method of claim 12 wherein the step of fusing comprises sintering at 500° C.

14. The resistor of claim 5 wherein the electrode has silver as its main constituent.

15. The resistor of claim 5 comprising two PTC thermistors.

16. The resistor of claim 5 wherein the terminals have elastic tabs and the PTC thermistor is elastically supported by the tabs.

17. The resistor of claim 6 wherein the electrode has silver as its main constituent.

* * * * *